(12) United States Patent
Yan (10) Patent No.: US 7,629,394 B2
(45) Date of Patent: Dec. 8, 2009

(54) UV CURABLE COATING MATERIAL OF ENCAPSULATED WATER DISPERSED CORE MATERIAL

(75) Inventor: Nianxi Yan, Appleton, WI (US)

(73) Assignee: Appleton Papers Inc., Appleton, WI (US)

(*) Notice: Subject to any disclaimer, the term of this patent is extended or adjusted under 35 U.S.C. 154(b) by 548 days.

(21) Appl. No.: 11/358,817

(22) Filed: Feb. 21, 2006

(65) Prior Publication Data

US 2007/0197384 A1    Aug. 23, 2007

(51) Int. Cl.
| C08F 2/48 | (2006.01) |
| C08F 2/50 | (2006.01) |
| C08J 3/28 | (2006.01) |
| B01J 13/20 | (2006.01) |
| B01J 13/00 | (2006.01) |
| B01J 13/02 | (2006.01) |

(52) U.S. Cl. ............... 522/85; 522/84; 522/86; 522/71; 522/74; 522/150; 522/153; 522/173; 522/178; 522/182; 264/4.1; 264/4.3; 264/4.33; 264/4.7; 521/76; 428/402.2

(58) Field of Classification Search .............. 428/402.2; 521/76; 264/4.1, 4.3, 4.33, 4.7; 522/84, 522/86, 85, 71–83, 150, 153, 173, 178, 182
See application file for complete search history.

(56) References Cited

U.S. PATENT DOCUMENTS

| 4,110,511 | A | * | 8/1978 | Lee et al. ..................... 503/215 |
| 4,140,516 | A | * | 2/1979 | Scher ........................ 504/220 |
| 4,157,983 | A | * | 6/1979 | Golden ................... 427/213.34 |
| 4,191,404 | A | * | 3/1980 | Lee et al. ..................... 503/211 |
| 4,200,667 | A | * | 4/1980 | Lee et al. ..................... 427/517 |
| 4,230,495 | A | * | 10/1980 | Lee et al. ..................... 523/161 |
| 4,534,783 | A | | 8/1985 | Beestman ....................... 71/27 |
| 5,132,117 | A | | 7/1992 | Speaker et al. .............. 424/490 |
| 5,225,278 | A | | 7/1993 | Kielbania, Jr. et al. . 428/402.22 |
| 5,401,577 | A | | 3/1995 | Seitz ..................... 428/402.21 |
| 6,042,641 | A | * | 3/2000 | Justice .................... 106/31.16 |
| 6,113,935 | A | | 9/2000 | Rodson et al. .............. 424/408 |
| 7,018,711 | B2 | * | 3/2006 | Wulff et al. ............ 428/402.21 |
| 2004/0089961 | A1 | * | 5/2004 | Wulff et al. .................. 264/4.7 |
| 2004/0166165 | A1 | | 8/2004 | Mistry et al. |

* cited by examiner

Primary Examiner—Sanza L McClendon
(74) Attorney, Agent, or Firm—Benjamin Mieliulis (57) ABSTRACT

The present invention describes a process of preparing microcapsules in a UV curable water immiscible phase. The microcapsules formed according to the invention contain an aqueous phase core. The process comprises dispersing a water soluble or dispersible core material along with at least one wall forming prepolymer and a polycondensation polymerization catalyst into an aqueous solution. The aqueous phase is then dispersed into the water immiscible phase comprising UV curable monomers or oligomers forming droplets of the aqueous phase solution in the water immiscible phase. Polycondensation of the prepolymers is initiated to form polymeric wall material or microcapsules at or near the interface of the water immiscible solvent and droplets of aqueous phase solution. Following capsule formation, a UV initiator is dispersed in the water immiscible phase. The UV curable dispersion containing aqueous microcapsules can be coated on a substrate. The coating is then cured by UV irradiation forming a gelled, solidified, or dry coating of aqueous microcapsules.

25 Claims, 1 Drawing Sheet

UV CURABLE COATING MATERIAL OF ENCAPSULATED WATER DISPERSED CORE MATERIAL

BACKGROUND OF THE INVENTION

1. Field of the Invention

This invention relates to encapsulation of water dispersed materials. It more particularly relates to UV curable microencapsulated systems.

2. Description of the Related Art

Processes of microencapsulation are well known. U.S. Pat. Nos. 2,730,456, 2,800,457; and 2,800,458 describe methods for capsule formation. Other useful methods for microcapsule manufacture are: U.S. Pat. Nos. 4,001,140; 4,081,376 and 4,089,802 describing a reaction between urea and formaldehyde; U.S. Pat. No. 4,100,103 describing reaction between melamine and formaldehyde; and British Pat. No. 2,062,570 describing a process for producing microcapsules having walls produced by polymerization of melamine and formaldehyde in the presence of a styrenesulfonic acid. Microcapsules are also taught in U.S. Pat. Nos. 2,730,457 and 4,197,346. Forming microcapsules from urea-formaldehyde resin and/or melamine formaldehyde resin is disclosed in U.S. Pat. Nos. 4,001,140; 4,081,376, 4,089,802; 4,100,103; 4,105,823; 4,444,699. Alkyl acrylate—acrylic acid copolymer capsules are taught in U.S. Pat. No. 4,552,811. Each patent described and cited in this specification is incorporated herein by reference to the extent each provides guidance regarding microencapsulation processes and materials.

U.S. Pat. No. 4,622,267 describes an interfacial polymerization process wherein a microcapsule wall of a polyamide, an epoxy resin, a polyurethane, a polyurea or the like is formed at an interface between two phases. The core material is initially dissolved in a solvent and an aliphatic diisocyanate soluble in the solvent mixture is added. Subsequently, a non-solvent for the aliphatic diisocyanate is added until the turbidity point is just barely reached. This organic phase is then emulsified in an aqueous solution, and a reactive amine is added to the aqueous phase. The amine diffuses to the interface, where it reacts with the diisocyanate to form polymeric polyurethane shells. A similar technique, used to encapsulate salts which are sparingly soluble in water in polyurethane shells, is disclosed in U.S. Pat. No. 4,547,429. U.S. Pat. No. 3,516,941 teaches polymerization reactions in which the material to be encapsulated, or core material, is dissolved in an organic, hydrophobic oil phase which is dispersed in an aqueous phase. The aqueous phase has dissolved materials forming aminoplast resin which upon polymerization form the wall of the microcapsule. A dispersion of fine oil droplets is prepared using high shear agitation. Addition of an acid catalyst initiates the polycondensation forming the aminoplast resin within the aqueous phase, resulting in the formation of an aminoplast polymer which is insoluble in both phases.

Common microencapsulation processes can be viewed as a series of steps. First, the core material which is to be encapsulated is emulsified or dispersed in a suitable dispersion medium. This medium is preferably aqueous but involves the formation of a polymer rich phase. Most frequently, this medium is a solution of the intended capsule wall material. The solvent characteristics of the medium are changed such as to cause phase separation of the wall material. The wall material is thereby contained in a liquid phase which is also dispersed in the same medium as the intended capsule core material. The liquid wall material phase deposits itself as a continuous coating about the dispersed droplets of the internal phase or capsule core material. The wall material is then solidified.

The above processes typically involve formation of an oil in water (o/w) emulsion. An aqueous suspension of microcapsules or coating of microcapsules is thereby typically obtained. Such capsule systems have the drawback of not readily encapsulating aqueous materials. A further drawback is that the resulting coatings as oil in water emulsions must be dried extensively. Carbonless coatings for example are applied on coating machines having substantial dryer sections for purposes of driving off the excess moisture.

Oil containing microcapsules dispersed in water are the largest volume use of microcapsules today and typically used for carbonless paper coatings. Microcapsules are used in pharmaceuticals, pesticides, paints, adhesives, sealants, inks, in addition to uses in carbonless or thermal paper applications.

Uses of microcapsules in adhesive is exemplified by Baetzold et al. (U.S. Pat. No. 6,084,010) which teaches solid, tacky or non-tacky hot melt glue compositions having incorporated therein microcapsules of a solvent capable of softening or further tackifying the hot melt.

Another type of encapsulated adhesive and sealant is that where the adhesive or sealant material or, in the case of a curable adhesive or sealant material, the components thereof are encapsulated in a single capsule. These capsules are typically applied to a substrate in a binder system that is non-tacky and dry to the touch. In this way, otherwise tacky or liquid flowable adhesives can be pre-applied, but not activated or bond forming until the capsule walls themselves are fractured releasing or exposing the adhesive materials. For example, Eichel (U.S. Pat. No. 2,986,477) teaches the encapsulation of tacky adhesive materials. Wallace (U.S. Pat. No. 4,428,982) teaches the encapsulation of curable anaerobic adhesives wherein the encapsulating material is air permeable so that the curable adhesive remains in a liquid or uncured state in the capsule until use. Schwantes (U.S. Pat. No. 6,592,990) teaches encapsulated adhesives, particularly pressure sensitive adhesives, wherein the adhesive is formed in-situ, after encapsulation of the ingredients therefore.

A common feature of each of the above systems is use of microcapsules encapsulating organic solvents. These typically are formed from oil in water emulsions, and usually require a substrate drying step.

The present invention by contrast relates to encapsulation of water dispersed materials, the microcapsule internal phase comprising an aqueous solution of a water soluble or water dispersible core material.

It would be advantageous and an advance in the art if a microcapsule suspension could be prepared that does not require extensive drying but could be formed as a curable coating. Carbonless paper or adhesive coated substrates or perfumed magazine inserts, or other coated substrates where capsules having a water soluble or water dispersible core are useful, when made with such a slurry or suspension would obviate needs for extensive drying of the substrate.

It is an object of the present invention to teach a novel coating containing microcapsules which is curable with actinic radiation and does not require substantial driving off of excess moisture.

SUMMARY OF THE INVENTION

The present invention is a novel UV curable coating of microcapsules made in a general sense from a water in oil emulsion. The coating of the invention eliminates the need to drive off substantial quantities of water. This eliminates the need for elaborate drying sections in substrate coating processes such as the elaborate drying sections typically used on paper coating equipment.

In one preferred alternative, the water immiscible phase or "oil" is selected to be free of organic solvents. UV curable monomers or oligomers are advantageously adapted to serve as the water immiscible phase during capsule formation and then made functional to cure the coating material with the addition of one or more UV free radical initiators.

The invention discloses a novel UV curable coating of microcapsules and process of preparing a UV curable coating of microcapsules from a water in oil type of emulsion, wherein the UV curable monomers are surrogates for the "oil." The process comprises providing an aqueous phase comprising a core material. Wall-forming water-soluble or water-dispersible prepolymers, oligomers or monomers, understood collectively as "prepolymers" for purposes hereof, are dissolved or dispersed into the aqueous phase. A water-immiscible phase is provided comprising at least one UV curable monomer or oligomer, at least one emulsifier, and at least one polymerization catalyst. The aqueous phase is dispersed into an excess of the water immiscible phase under high shear agitation to form droplets of the aqueous phase dispersed in the water immiscible phase. A water-oil interphase results at the interphase of the aqueous and water-immiscible phases. Polycondensation of the monomers, oligomers or prepolymers in the dispersed aqueous phase is initiated by heating to thereby precipitate the monomers, oligomers and prepolymers from the aqueous phase at the water-oil interphase, thereby forming wall material encapsulating the droplets of the aqueous phase. The result is formation of microcapsules. The microcapsule internal phase comprises water and the intended core material.

In an alternative embodiment, organic solvent can be blended as part of the water immiscible phase. In a yet further embodiment, the water immiscible phase is selected to comprise at least one organic solvent, at least one emulsifier, and at least one polymerization catalyst.

With these alternative embodiments, the capsules are optionally either decanted and transferred to a UV curable carrier, or more preferably, UV curable monomers or oligomers are dispersed into the water immiscible phase, and in each case along with a UV free radical initiator.

After coating the above described compositions onto a substrate, the UV curable monomers or oligomers can be irradiated with ultra violet light to decompose the UV free radical initiator and to cure the water immiscible phase solution forming a cured coating containing the microcapsules. The microcapsules in the cured coating have an aqueous internal phase and a core material.

The core material in the capsules can be any water soluble or water dispersible material. Preferably the water-immiscible phase should be substantially a non-solvent for the core material.

The core material can be selected by way of illustration and not limitation from water-soluble or water dispersible chromogens, dyes, dye precursors, pharmaceuticals, fragrances, aromas, odor maskers, absorbers, essential oils, herbicides, pesticides, bactericides, cleansers, soaps, detergents, phase change materials, colorants, adhesives, sealants, inks, perfumes, flavorants, indicators, lotions, moisturizers, conditioners, emollients, lubricants, enzymes, or other active materials depending on the desired end use application. The skilled artisan will readily recognize the wide variety of core materials that can be advantageously employed within the scope of the invention.

The UV curable coating of the invention yields a coating of microcapsules in a curable water immiscible phase. Internally, the microcapsules contain an aqueous phase solution. In the process of the invention, a water-soluble or water-dispersible core material and at least one wall-forming prepolymer are dispersed into an aqueous solution to form the aqueous phase solution.

A polymerization catalyst is dispersed into the water immiscible phase solution. The aqueous phase solution is dispersed into the water immiscible phase solution to form droplets of the aqueous phase solution in the water immiscible phase solution.

Polycondensation of the prepolymers is then initiated preferably by heating, to form polymeric wall material at or near the interface of the water immiscible solvent and droplets of aqueous phase solution, thereby forming microcapsules surrounding the droplets of aqueous phase solution, with the microcapsules being dispersed in the water immiscible phase solution. The temperature for initiating polycondensation is a function of the polymerization catalyst selected but typically would be in the range of 40° C. to 120° C., preferably 55° C. to 90° C.

Initiating polycondensation of the prepolymers for the wall formation can be accomplished by heating or, depending on the polymerization catalyst selected, by other means of initiating polycondensation such as acid catalysis or radiation. Heating is preferred. The polymerization catalyst can be optionally selected from an acid, a phase transfer catalyst or a proton transfer catalyst.

Wall forming prepolymer can be selected from gelatin, urea formaldehyde, urea-melamine-formaldehyde, urea resorcinol formaldehyde, melamine formaldehyde, novolac, phenolic, polyurethane, polyester, polyamide, polyurethane-polyether resin, and the like. Urea formaldehyde, melamine formaldehyde, novolac and phenolic resins are preferred.

Optionally, and alternatively, at least one component of the wall forming prepolymer can also be dispersed in the water immiscible solvent. For example, with polyureas, the isocyanate adduct can be dissolved in the water immiscible phase. A reactive amine can be dispersed in the aqueous phase for reacting to form the urea linkages and capsule wall. Polyamides such as formed from diacid chlorides reacted with diamines can also be advantageously employed in this manner as wall material, as well as amines reacted with aldehydes.

Where the water immiscible phase is an organic solvent, then after capsule formation, UV curable monomers or oligomers and an initiator can be dispersed into the water immiscible solvent or, alternatively the capsules decanted and transferred into UV curable monomers or oligomers. The resulting coating mixture can be applied to a substrate. UV curing of the UV curable monomers or oligomers is then effected to cure the coating mixture forming a dry-to-the-touch coating.

DETAILED DESCRIPTION

Encapsulation of water-soluble materials is always a challenge because of their polarity and small size of water molecules. The most commonly used methods are lipid coating, organic phase separation and w/o/w (water/oil/water) multiple emulsion methods. Lipid coating processes such as fluidized bed coating or spinning disk coating are used mainly for encapsulating water-soluble solid materials, and the size of capsules is usually at least a few hundred microns to millimeters. There are a few variations to w/o/w multiple emulsion methods such as solvent evaporation, or solvent extraction, however, these variations typically involve a solvent removal step after encapsulation, and solvent recovery for recycle in the process. These steps make the encapsulation process expensive, and the residual solvent trapped in the shell matrix can be a concern for some applications. Furthermore, encapsulation efficiency is low since materials to be encapsulated can transfer from the internal aqueous phase to the outside aqueous phase before a shell is completely solidified or cross-linked.

Water-soluble materials may be encapsulated via water-in-oil emulsions using interfacial polymerization between two monomers. One monomer is selected water-soluble and the other is oil-soluble. Such method typically involves droplet precipitation and produces clumped capsules because some of the water-soluble monomers partition into the oil phase, and react with oil-soluble monomer in the bulk oil phase rather than at the oil-water interface, causing clumping of capsules.

The present invention provides an improved process for encapsulating water-soluble or water-dispersible materials via water-in-oil emulsions. The wall deposition occurs primarily from the internal aqueous phase onto the oil-water interface, and thus forms a population of individual capsules encapsulating water and core material. A wall component can be positioned in the other phase to reactively cooperate in wall formation as an alternative mechanism. The process can be generally summarized as:

providing an aqueous phase comprising material(s) to be encapsulated. One or more pre-polymers such as melamine formaldehyde or urea-formaldehyde, or aminoplast are dissolved or dispersed in the aqueous phase (pre-polymers include for purposes hereof, monomers and oligomers);

preparing a water-in-oil emulsion by dispersing the aqueous phase into a water-immiscible (oil) phase comprising one or more UV curable monomers or oligomers, one or more emulsifiers and a catalyst;

initializing polycondensation of the pre-polymers in the aqueous phase by heating to form polymers, and force precipitation of the polymers from the aqueous internal phase droplets onto the water-oil interface to form a wall, thus forming microcapsules. This can be achieved by heating the catalyst in the oil phase to induce the polycondensation reaction at or near the oil-water interface, and thereby forming a shell to encapsulate the aqueous droplet. The catalyst may be an acid, such as water insoluble sulfonic acids, a phase transfer catalyst, or a proton transfer catalyst. Examples of catalyst include organo sulfonic acids organo sulfuric acids or organo phosphoric acids. These acids can be used in solid or liquid form. In solid form, a useful form is as polymeric copolymers such as fluorinated sulfonic acid copolymers, where the sulfonic group is chemically active. Dupont Nafion™ powders are an example. Other useful catalysts are ion exchange particles such as Dowex™ acid cation ion exchange spherical powders.

In a broad sense, the present invention is a novel UV curable coating of microcapsules and process of preparing a UV curable coating of microcapsules from a water in oil emulsion. The process comprises, providing an aqueous phase comprising a core material. Wall-forming water-soluble or water-dispersible prepolymers, oligomers or monomers are dissolved or dispersed into the aqueous phase. The amount of prepolymer for forming the capsule wall is 2 to 40 wt %, and more preferably from 5 to 20 wt % of the weight of the aqueous phase. A separate water-immiscible phase is provided comprising at least one UV curable monomer or oligomer, at least one emulsifier, and at least one catalyst. The aqueous phase is dispersed into an excess of the water immiscible phase under high shear agitation to form droplets of the aqueous phase dispersed in the water immiscible phase. A water-oil interphase results at the interphase of the aqueous and water-immiscible phases. Poly condensation of the monomers, oligomers and prepolymers in the dispersed aqueous phase is initiated by heating to thereby precipitate the monomers, oligomers and prepolymers from the aqueous phase at the water-oil interphase thereby forming wall material encapsulating the droplets of the aqueous phase. The result is formation of microcapsules.

In an alternative embodiment organic solvent can be blended as part of the water immiscible phase. In a yet further embodiment, the water immiscible phase is selected to comprise at least one organic solvent, at least one emulsifier, and at least one polymerization catalyst.

With these alternatives, the capsules are optionally either decanted and transferred to a UV curable carrier, or more preferably, UV curable monomers or oligomers are dispersed into the water immiscible phase along with a UV free radical initiator forming a coating mixture. With any of the above-described constructs, after coating onto a substrate, the UV curable monomers or oligomers are irradiated with ultra violet light to decompose the UV free radical initiator and to cure the water immiscible phase solution thereby forming a cured coating containing the microcapsules. UV curing typically can be effected at from about 30 to 1000 feet per minute (9.1 meters to 305 meters per minute) at an intensity of 200 to 600 watts per inch (78.7 to 236 watts per centimeter). The microcapsules of the cured coating have an aqueous internal phase and a core material.

The materials to be encapsulated should be soluble or dispersible in the aqueous phase. The capsule core can be, but is not limited to organic or inorganic chemicals, polymers, hydrogels, clays, bioactive materials such as drugs and pharmaceuticals, enzymes, or proteins, insecticides, fungicides, bactericides, cleansers, soaps, detergents, dyes, chromogens, fragrances, odor maskers, perfumes, lubricants, soluble minerals, adhesives, emollients, conditioners or combination of any of the foregoing. When a material is intended to be encapsulated which is not soluble in the aqueous phase, the encapsulated phase can be an aqueous suspension of the material.

The "oil" phase is selected to be preferably a UV curable monomer, but optionally a UV curable monomer blended with an organic solvent, or, alternatively, any organic solvent that is not miscible with water and preferably a non-solute for the core material. An emulsifier may be added for stabilizing the water-in-oil emulsion.

For many emulsifiers, hydrophobic-lipophilic balance numbers are reported in the literature and can be a useful guide in selection of emulsifier.

| Emulsifier | HLB value |
| --- | --- |
| Glycerol monostearate | 3.8 |
| Diglycerol monostearate | 5.5 |
| Tetraglycerol monostearate | 9.1 |

-continued

| Emulsifier | HLB value |
| --- | --- |
| Succinic acid ester of monoglycerides | 5.3 |
| Diacetyl tartaric acid ester of monoglycerides | 9.2 |
| Sodium stearoyl-2-lactylate | 21.0 |
| Sorbitan tristerate | 2.1 |
| Sorbitan monostearate | 4.7 |
| Sorbitan monooleate | 4.3 |
| Poloxyethylene sorbitan monostearate | 14.9 |
| Propylene glycol monostearate | 3.4 |
| Polyoxyethylene sorbitan monooleate | 15.0 |

HLB—hydrophilic-lipophilic balance

Typical w/o emulsifiers generally have an HLB (hydrophilic-lipophilic balance) value of 3 to 6. HLB values above about 8 generally are used to promote o/w emulsions.

The capsules obtained by the process of the invention are suspended in the oil phase. When dry powders of the microcapsules are needed, the oil can be removed by some traditional methods, such as filtration, decanting, washing with a suitable solvent, etc.

In one alternative, the oil is removed by filtration, and the obtained capsules are re-dispersed into a solvent or binder or curable monomer, polymer or oligomer along with UV initiator that is suitable for a particular application, as UV-curable carbonless coatings, UV-curable adhesive coatings and the like.

In a more preferred instance, the oil phase is selected so that the capsule in oil suspension can be used directly in a particular application such as a coating. UV curable prepolymers, monomers or oligomers are added to the oil suspension (water immiscible phase) following capsule formation along with a UV free radical initiator. Irradiating the UV curable prepolymers, monomers or oligomers with ultra-violet light decomposes the UV free radical initiator and causes cure of the water immiscible phase adhering and immobilizing the capsules in the coating. The amount of UV curable prepolymers, monomers, or oligomers should be from 0.5 to 99.5 wt % (weight percent) and preferably 5 to 80 wt %, and most preferably 40 to 75 wt % based on weight of coating. Curing of the water immiscible phase solution results in formation of a dry-to-the-touch cured coating containing microcapsules. The capsules contain an aqueous internal phase and the selected core material.

Useful monomers or oligomers useful as the "oil" phase in the invention are mono-, di- or poly-functional acrylate esters, methacrylate esters, urethane acrylate esters, urethane methacrylate esters, epoxy acrylate eaters, or epoxy methacrylate eaters. They can be used alone or in combination as blends. The monomer and/or oligomer blend is preferably selected to be a free flowing liquid, meaning preferably a viscosity of less than 500 centipoise (Cp). Centipoise is equivalent to milliPascal-second units (milliPascal-second). Viscosity parameters herein are understood as measured at 25° C. unless otherwise indicated.

Preferably the viscosity of the monomer and/or blend is less than 100, and even more preferably less than about 25 Cp (milliPascal-second).

Useful monofunctional acrylates, methacrylates and urethane acrylates, urethane methacrylates include, by way of illustration and not limitation, monomers and oligomers of alkyl acrylate, aralkyl acrylate, cycloalkyl acrylate, alkoxy acrylate, cycloalkoxy acrylate, bicycloalkyl acrylate, alkoxy (alkoxy)$_n$ acrylate, alkyl methacrylate, polyalkene(meth) acrylate, aralkyl methacrylate, cycloalkyl methacrylate, alkoxy methacrylate, bicycloalkyl methacrylate, cycloalkoxy methacrylate, and alkoxy (alkoxy)$_n$ methacrylate. The alkyl moieties should be selected preferably of 1 to 16 carbons, the cycloalkyl moieties from 4 to 8 carbons, and n is an integer from 1 to 6.

More particularly monofunctional acrylates, methacrylate or urethane acrylates or methacrylates can be selected from, by way of illustration and not limitation, n-pentyl acrylate, 2-methyl butyl acrylate, 2-ethylhexyl acrylate, n-octyl acrylate, n-decyl acrylate, n-dodecyl acrylate, lauryl methacrylate, lauryl acrylate, stearyl acrylate, stearyl methacrylate, 2-ethylhexyl methacrylate, n-octyl methacrylate, iso-octyl acrylate, iso-octyl methacrylate, isononyl acrylate, isodecyl acrylate, isobornyl acrylate, isobornyl methacrylate, 2-ethoxyethyl methacrylate; butyl diglycol methacrylate; tetrahydrofurfuryl acrylate; tetrahydrofurfuryl methacrylate; furfuryl methacrylate 2-phenoxyethyl acrylate, isohexyl acrylate; tridecyl acrylate; tridecyl methacrylate; ethoxylated nonyl phenol acrylate and the like and mixtures thereof.

Useful di-functional monomers for example can be selected from the group of monomers and oligomers consisting of alkene glycol dimethacrylate, alkyl dimethacrylate, alkyldiol dimethacrylate, alkoxy alkanol diacrylate, trialkanol triacrylate, alkoxy(alkoxy)$_n$ alkyl triacrylate, alkoxy (alkoxy)$_n$ alkyl dimethacrylate, aralkyl dimethacrylate, cycloalkyl dimethacrylate, alkoxy dimethacrylate, bicycloalkyl dimethacrylate, cycloalkoxy dimethacrylate, alkene glycol diacrylate, alkyl diacrylate, alkyldiol diacrylate, alkoxy alkanol dimethacrylate, trialkanol trimethacrylate, alkoxy (alkoxy)$_n$ alkyl trimethacrylate, alkoxy (alkoxy)$_n$ alkyl diacrylate, aralkyl diacrylate, cycloalkyl diacrylate, alkoxy diacrylate, bicycloalkyl diacrylate, cycloalkoxy diacrylate, wherein the alkyl and alkene moieties are of 1 to 16 carbons, the cycloalkyl moieties are of 4 to 8 carbons, n is an integer from 1 to 6. Aromatic polyether urethane (meth)acrylates, aliphatic polyester, aliphatic urethane acrylate including alkyl, alkenyl or aryl substituted or unsubstituted urethane acrylates and epoxy acrylates can also be advantageously employed.

More specifically, by way of illustration and not limitation, the monomers can be selected from any of hexyl dimethacrylate; triethylene glycol dimethacrylate; ethylene glycol dimethacrylate; tetraethylene glycol dimethacrylate; polyethylene glycol dimethacrylate; 1,3 butylene glycol diacrylate; 1,4-butanediol dimethacrylate; 1,4-butanediol diacrylate; diethylene glycol diacrylate; diethylene glycol dimethacrylate; 1,6 hexanediol diacrylate; 1,6 hexanediol dimethacrylate; neopentyl glycol diacrylate; neopentyl glycol dimethacrylate, polyethylene glycol diacrylate; tetraethylene glycol diacrylate; triethylene glycol diacrylate; 1,3 butylene glycol dimethacrylate; tripropylene glycol diacrylate; ethoxylated bisphenol diacrylate; ethoxylated bisphenol dimethyacrylate; dipropylene glycol diacrylate; alkoxylated hexanediol diacrylate; alkoxylated cyclohexane dimethanol diacrylate; propoxylated neopentyl glycol diacrylate, trimethylolpropane trimethacrylate; trimethylolpropane triacrylate, pentaerythritol triacrylate, ethoxylated trimethylolpropane triacrylate, propoxylated trimethylolpropane triacrylate, propoxylated glyceryl triacrylate, ditrimethylolpropane tetraacrylate, dipentaerythritol pentaacrylate, ethoxylated pentaerythritol tetraacrylate, and the like, and mixtures thereof.

In the preferred embodiment, when the capsules are to be used in a coating or printing application to deliver a particular feature, based on core material, the selected UV curable monomer(s), oligomer(s) or prepolymer(s) are used as the oil phase, and the capsule in oil suspension directly used in a coating or printing formulation after it has been formulated with suitable initiator(s). The "oil" in this sense, is the UV curable monomer or oligomer itself, or optionally can include added organic solvent. Depending on the application, the monomer(s) may be selected for a required curing mechanism for the coating. A photo curable monomer(s) can be selected for curing at a particular wavelength, such as ultraviolet (UV) cure, and/or electron beam cure. These materials can provide fast curing speed, and preferably are selected to be environment friendly.

Useful optional oils or solvents for the water immiscible phase for blending with the UV curable monomers or oligomers can include common microencapsulation solvents. The solvents can include by way of illustration:

| | |
|---|---|
| A. | dialkyl phthalates in which the alkyl groups thereof have from 4 to 13 carbon atoms, e.g., dibutyl phthalate, dioctylphthalate, dinonyl phthalate and ditridecyl phthalate |
| B. | 2,2,4-trimethyl-1,3-pentanediol diisobutyrate (U.S. Pat. No. 4,027,065) |
| C. | ethyldiphenylmethane (U.S. Pat. No. 3,996,405) |
| D. | alkyl biphenyls such as monoisopropylbiphenyl (U.S. Pat. No. 3,627,581) |
| E. | C10–C14 alkyl benzenes such as dodecyl benzene |
| F. | diaryl ethers, di(aralkyl)ethers and aryl aralkyl ethers, ethers such as diphenyl ether, dibenzyl ether and phenyl benzyl ether |
| G. | liquid higher dialkyl ethers (having at least 8 carbon atoms) |
| H. | liquid higher alkyl ketones (having at least 9 carbon atoms) |
| I. | alkyl or aralky benzoates, e.g., benzyl benzoate |
| J. | alkylated naphthalenes |
| K. | partially hydrogenated terphenyls |
| L. | vegetable oils, esters of vegetable oils |
| M. | various hydrocarbons |
| N. | blend of any of the foregoing |

The UV curable prepolymers, monomers or oligomers which can be added to the water immiscible phase or into which the formed capsules can be decanted, include materials such as those curable using electron beam, UV radiation or visible light, such as acrylated monomers or oligomers of acrylated epoxy resins, acrylated urethanes and polyester acrylates and acrylated monomers including monoacrylated, multiacrylated monomers, as well as mixtures. Examples of suitable UV curable prepolymers, monomers or oligomers also include unsaturated polyester resin and alkyl resins, unsaturated melamine formaldehyde resins, polybutadiene resins, and unsaturated compounds such as (meth)acrylates and allyl compounds. The curing mechanism through UV light can be employed with or without the assistance of an additional thermal cure mechanism. In the context of this application it is understood that the term UV curable is used synonymously and intended synonymous with "radiation curable" and embraces the use of visible light, or ultraviolet (UV) light, infrared, and electron functions and radiation cure functions can be provided by different functionalities in the same molecule.

Examples of UV curable prepolymers include polyesters including polycondensation products from unsaturated di- or polycarboxylic acids or derivatives thereof, for instance: maleic acid, maleic anhydride and/or fumaric acid, and polyols such as ethylene glycol, 1,2-propane diol, diethylene glycol, hexane diol, glycerol, trimethylol propane or pentaerythritol. These polyesters can be blended with ethylenically unsaturated monomeric compounds, such as methacrylic compounds and vinyl compounds, including acrylate compounds and allyl compounds.

Illustrative UV curable (meth)acrylates and allyl compounds include methyl acrylate, methyl methacrylate, ethyl acrylate, ethyl methacrylate, butyl acrylate; (meth)acrylic esters of aliphatic diols and/or polyols, for instance: ethylene diacrylate, trimethylol propane triacrylate and pentaerythritol tetraacrylate; hydroxyl(meth)acrylates such as hydroxyethyl acrylate, 2-hydroxypropyl acrylate, 3-hydroxypropyl methacrylate, 4-hydroxybutyl acrylate and pentaerythritol triacrylate and allyl compounds such as diallyl phthalate, diallyl maleate, triallyl isocyanurate and ethylene glycol diallyl ether.

A desirable UV curable prepolymer, monomer or oligomer is urethane acrylate resin, more particularly having at least one isocyanate group-containing adduct of (a) an acrylic or methacrylic hydroxyl ester having 5 to 20 carbons atoms and (b) a polyisocyanate having 4 to 44 carbon atoms and 2 to 4 isocyanate groups. As examples of suitable isocyanate compounds may be mentioned hexamethylene diisocyanate, 2,2,4-trimethylhexane-1,6-diisocyanate, 2,4,4-trimethylhexane-1,6-diisocyanate, and cyclohexyl-1,4-diisocyanate, or the adduct of hexamethylene diisocyanate.

Suitable photoinitiators include for example: aromatic carbonyl compounds such as benzyl, benzyl dimethyl ketal, acetophenone, substituted acetophenones, thioxanthone chlorothioxanthone and preferably benzophenone. Optionally, use may be made of compounds such as aromatic azo compounds and compounds such as benzoin and ethers thereof, such as the methyl ether, the ethyl ether, the propyl ether and the t-butyl ether. Mixtures of photoinitiators may also be used.

The photoinitiator is usually present in an amount of approximately 0.05 to 10% by weight, based on the UV curable prepolymer, monomer or oligomer. Some free radical polymerizations are inhibited by oxygen and may require provision of an inert atmosphere.

Preferably the UV curable prepolymer, monomer or oligomer is a reactive oligomer or prepolymer which polymerizes when subjected to UV radiation in the presence of a suitable initiator. Optional components include diluents which modify the cure rate and, for example, the viscosity of the uncured composition. The UV curable prepolymer, monomer or oligomer should wet or adhere to the substrate before curing, and adhere on curing.

Various additives, including viscosity modifiers, fillers, plasticizers, binders, adjuvants, and diluents can be used to modify either the wall material or the final properties of the UV curable polymers when cured, and render them more suitable for particular end uses.

Binders, such as polyvinyl alcohol, or various latexes, carboxymethyl cellulose, waxes, wetting agents, and plasticizers such as phthalate esters, can also be added to the UV curable monomers to modify the properties of the coating, or aid in adherence to certain substrates. Viscosity modifiers such as epoxy acrylates can be advantageously employed. Any material which does not dissolve the microcapsule wall may ordinarily be added to the UV curable monomers.

Optionally, depending on the application, fillers and pigments may be included after capsule formation and added to the UV curable monomers. Fillers may be powdered, granular, particulate or fibrous and can include clay, talc, glass, titanium dioxide, silicon carbide, mica, silica, and the like. Fillers may be added in amounts ranging from 1 to 95 percent.

Diluents can also be optionally added to obtain faster cure times and to modify the properties of the cured monomers and oligomers. These may include tackifiers, polyols, polyesters, epoxy acrylates, epoxy methacrylates, polyurethanes, anhydrides, aromatic or cycloaliphatic or aliphatic polyisocyanates, phenylglycidyl ether, declyglycidyl ether and the like, butyl ester of epoxidized linseed oil, beta- or gamma-butyrolactone, styrene, D-limonene, dioxane, trioxane and the like. Diluents may be optionally added in amounts of up to about 60 wt % based upon the total weight of the UV curable monomers.

In the invention the water immiscible phase solution with catalyst and emulsifier is prepared as the continuous phase or phase in excess. The water immiscible phase solution comprises a water immiscible solvent as described above. The aqueous phase solution with core material and wall forming prepolymer is dispersed into the water immiscible solvent thereby forming droplets of the aqueous phase solution in the water immiscible phase solution. The result is an unconventional water in oil (w/o) emulsion. Polycondensation by heating of the prepolymers forms wall material at or near the interface of the water immiscible solvent and droplets of aqueous phase solution thereby forming microcapsules.

After capsule formation, a coating mixture is formed by addition of UV initiator to the UV curable monomers or oligomers. By irradiating the monomers or oligomers dispersed in the water immiscible solvent, cure of the monomers or oligomers is effected without the need for an elaborate drying apparatus for high volume application. Polymerization or curing reaction solidifies or gels the water immiscible phase solution.

The dispersed microcapsules can be coated onto a substrate before being irradiated with ultra violet light to cure the water immiscible phase resulting in a gelled, tackified or dry coating with immobilized microcapsules containing an aqueous phase core.

In the examples herein, unless otherwise indicated, all measurements, percentages and parts are by weight. The examples are not intended to be exhaustive. In the following examples, general procedures are described for preparing illustrative UV curable coating mixtures and components thereof according to the invention.

In the examples, and in the invention the desired core material is selected based on the intended application of the cured coating. In Examples 1-12 a carbonless color former can be dissolved or dispersed in the aqueous phase at about 0.25 to about 30 wt % by weight, preferably about 6 wt % based on the weight of the aqueous phase. The skilled artisan will readily ascertain optimal amount of core, which can be more or less than the above amounts, depending on the specific core. The color former can be selected from any of crystal violet lactone or fluorans such as by way of illustration 3-diethylamino-6-methyl-7-anilino fluoran or 3-diethylamino-7-anilino fluoran or various fluorans disclosed in U.S. Pat. Nos. 3,681,390; 4,510,513; 3,624,107 and the like. The cured polymeric coating on paper or film is a useful carbonless CB coated back ply. Alternatively in these examples the core can be substituted such as by being selected to be a water soluble or water dispersible oil or perfume such as pine oil, spearmint, lemon oil, mercaptans, or fragrant cyclic ketones or any of the other core materials taught in this specification. Another material useful to be substituted as a core is the enzyme tyrosinase. The core material should be water soluble or water dispersible but is not otherwise limited in the invention.

EXAMPLE 1

In a jacketed reactor, 200 grams of ethoxylated nonylphenol acrylate and 10 grams of Arlacel P135 (PEG-30 dopolyhydroxystearate from Uniqema) were combined, and heated to 45° C. while mixing. In a separate beaker, an aqueous solution to be used as the internal phase (IP) of the microcapsules was prepared by combining 100 grams of deionized water and 15.0 grams of melamine formaldehyde resin and pH of the solution was adjusted to 5.71 with 2.0 grams of 0.1 N HCl solution. The IP solution was then emulsified into the ethoxylated nonylphenolacrylate with a mechanical mixer at 550 rpm for 10 minutes, and a water-in-oil emulsion was obtained. 1.7 grams of DABSA (dialkylbenzene sulfonic acid) was added into the reactor, and temperature of the reactor was brought up to 65° C. and maintained at this temperature for 8 hrs. Water-containing microcapsules suspended in the ethoxylated nonylphenolacrylate with mean size of around 6 μm were obtained.

EXAMPLE 2

In a jacketed reactor, 200 grams of isobornyl acrylate (Sartomer, Exton, Pa.) and 5 grams of Arlacel P135 (PEG-30 dopolyhydroxystearate (Uniqema, New Castle, Del.) were combined, and heated to 45° C. while mixing. In a separate beaker, an aqueous solution to be used as the internal phase (IP) of the microcapsules was prepared by combining 100 grams of deionized water and 15.9 grams of melamine formaldehyde resin and pH of the solution was adjusted to 5.61 with 3.8 grams of 0.1 N HCl solution. The IP solution was then emulsified into the isobornylacrylate solvent blend with a mechanical mixer at 550 rpm for 15 minutes, and a stable water-in-oil emulsion was obtained. At this time, 3.1 grams of dialkylbenzene sulfonic acid (DABSA) was added into the reactor, and temperature of the reactor was brought up to 65° C. and maintained at this temperature for 8 hrs. Water-containing microcapsules suspended in isobornylacrylate with mean size of around 15 μm were obtained.

EXAMPLE 3

The composition of and the procedures for preparing the microcapsules were the same as in Example 2 except that there were 8.0 grams of polyacrylic acid was added to the IP.

EXAMPLE 4

The composition of and the procedures for preparing the microcapsules were the same as in Example 2 except that 2.1 grams of Arlacel P135 was combined with isobornylacrylate as the oil phase.

EXAMPLE 5

The composition of and the procedures for preparing the microcapsules were the same as in Example 2 except that isobornyl methacrylate was used to replace isobornylacrylate as the oil phase.

EXAMPLE 6

The composition of and the procedures for preparing the microcapsules were the same as in Example 2 except that stearyl methacrylate was used to replace isobornylacrylate as the oil phase.

EXAMPLE 7

In a jacketed reactor, 180 grams of Norpar solvent (a mixture of linear paraffin from Exxon Mobil) and 9 grams of sorbitan monooleate are combined, and are heated to 45° C. while mixing. In a separate beaker, an aqueous solution to be used as the internal phase (IP) of the microcapsules is prepared by combining 100 grams of deionized water and 20 grams of melamine formaldehyde resin. The pH of the solution is adjusted to 5.73 with 2.6 grams of 0.1 N HCl solution. The IP solution is then emulsified into Norpar linear paraffin solvent with a mechanical mixer at 1500 rpm for 30 minutes, and a stable water-in-oil emulsion is obtained. 2 grams of Dupont Nafion™ powder (fluorinated sulfonic acid copolymers) is added into the reactor, and temperature of the reactor is brought up to 65° C. and maintained at this temperature for 8 hours. With the solid particle catalysts the sulfonic acid group is fixed within the polymer matrix, but the sulfonic groups are chemically active. Water-containing microcapsules suspended in Norpar-12 with mean size of around 15 μm are obtained.

EXAMPLE 8

In a jacketed reactor, 200 grams of isobornyl acrylate (Sartomer Company, Inc., Exton, Pa.) and 5 grams of Arlacel P135 (PEG-30 dopolyhydroxystearate from Uniquema) are combined, and are heated to 45° C. while mixing. In a separate beaker, an aqueous solution to be used as the internal phase (IP) of the microcapsules is prepared by combining 100 grams of deionized water and 15.9 grams of melamine formaldehyde resin and pH of the solution is adjusted to 5.61 with 3.8 grams of 0.1 N HCl solution. The IP solution is then emulsified into isobornylacrylate solvent with a mechanical mixer at 550 rpm for 15 minutes, and a stable water-in-oil emulsion is obtained. At this time, 2 grams of Dowex™ ion acidic cation exchange spherical powders (Dow Chemical Company, Midland, Mich.) are added into the reactor, and temperature of the reactor is brought up to 65° C. and maintained at this temperature for 8 hours. Water-containing microcapsules suspended in isobornyl acrylate with mean size of around 15 μm are obtained.

EXAMPLE 9

In a jacketed reactor, 180 grams of normal paraffinic hydrocarbon solvent (Exxon Mobile) and 9 grams of sorbitan monooleate were combined, and heated to 45° C. while mixing. In a separate beaker, an aqueous solution to be used as the internal phase (IP) of the microcapsules was prepared by combining 100 grams of deionized water and 20 grams of Cymel melamine formaldehyde resin (Cytec, West Paterson, N.J.), and pH of the solution was adjusted to 5.73 with 2.6 grams of 0.1 N HCl solution. The IP solution was then emulsified into normal paraffinic hydrocarbon solvent with a mechanical mixer at 1500 rpm for 30 minutes, and a stable water-in-oil emulsion was obtained. At this time, 1.3 grams of dialkylbenzene sulfonic acid (DABSA) was added into the reactor, and temperature of the reactor was brought up to 65° C. and maintained at this temperature for 8 hrs. Water-containing microcapsules suspended in the hydrocarbon solvent with mean size of around 15 μm were obtained.

EXAMPLE 10

The composition of and the procedures for preparing the microcapsules were the same as in Example 9 except that IP was emulsified into paraffinic hydrocarbon solvent at room temperature (22° C.), and the temperature was then brought up to 65° C. after the addition of the acid.

EXAMPLE 11

In a jacketed reactor, 180 grams of SAS-310 (a blend of substituted aromatic hydrocarbons (Nisseki Chemical) and 9 grams of sorbitan monooleate are combined, and heated to 45° C. while mixing. In a separate beaker, an aqueous solution to be used as the internal phase (IP) of the microcapsules is prepared by combining 100 grams of deionized water and 20 grams of Cymel melamine formaldehyde resin (Cytec, West Paterson, N.J.), and pH of the solution is adjusted to 5.73 with 2.6 grams of 0.1 N HCl solution. The IP solution is then emulsified into the aromatic hydrocarbon solvent with a mechanical stirrer at 1500 rpm for 30 minutes, and a stable water-in-oil emulsion is obtained. At this time, 1.3 grams of dialkylbenzene sulfonic acid (DABSA) is added into the reactor, and temperature of the reactor is brought up to 65° C. and maintained at this temperature for 8 hrs. Water-containing microcapsules suspended in the hydrocarbon solvent can be obtained by this process.

EXAMPLE 12

The microcapsule suspensions of the above examples formed two distinct layers in the reactor upon phase separation due to density difference between capsules and the continuous solvent (oil) phase, with capsules forming a cake at the bottom of the reactor, and a top oil layer comprising of mainly solvent and residual surfactant. These two layers could be easily mixed to form a homogeneous suspension for use in an application. In Examples 9-11, the solvents were non-reactive and could be decanted, and the capsule cake collected.

UV curable coatings were prepared by including water-containing capsules in the coating formulation as shown in Table 1. In the case of Test #2, capsule cake was obtained by decanting the solvent, and the cake was easily re-dispersed into a curable monomer SR506 (Sartomer, Exton, Pa.). 1,3-butylene glycol dimethacrylate was used as a cross linker, and modified epoxy acrylate, CN115 (Sartomer Company, Inc.) was added as a viscosity modifier. A photo initiator (PI) mixture comprising a blend of Darocur 1173 (CIBA Specialty Chemicals) and Irganox 1010F (CIBA Specialty Chemicals) with a ratio of 10 to 1 was then added to the curable monomer.

Figure 1:
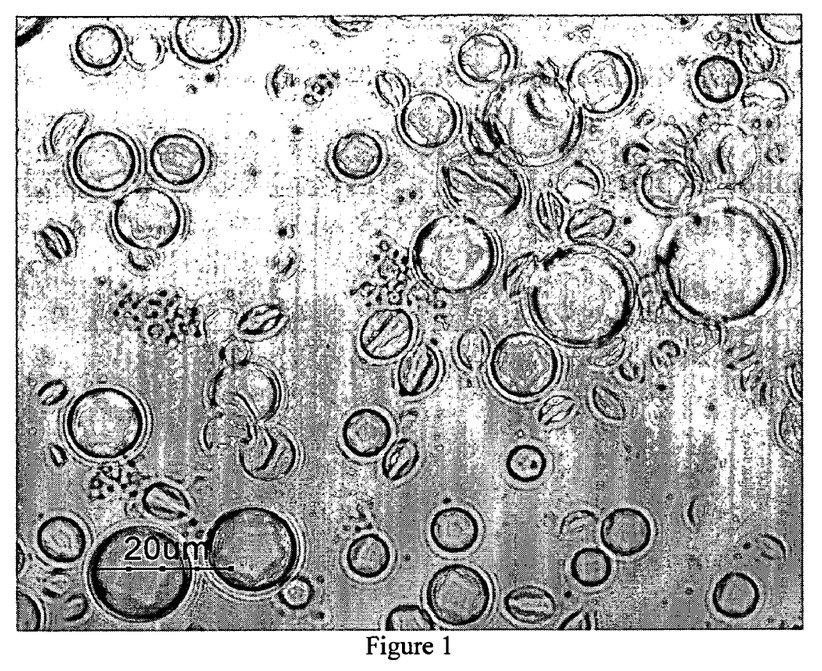
FIG. 1 is a photomicrograph of microcapsules according to the invention containing an aqueous core.
Figure 2:
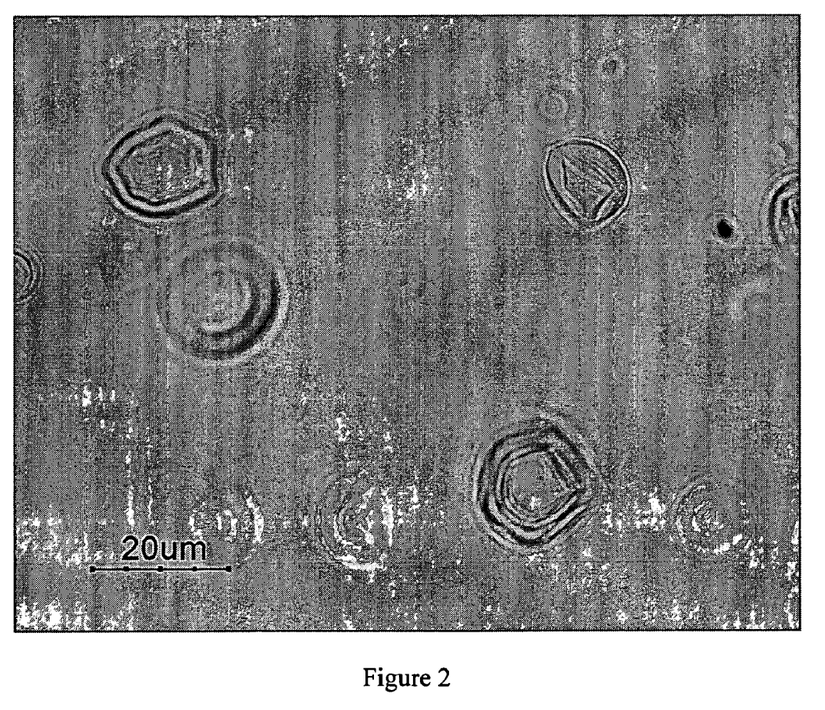
FIG. 2 is a photomicrograph of a UV cured coating with embedded microcapsules.

The UV curable coating mixture was coated onto clear polyester panels. The coated panels were placed on a conveyor belt of a UV curing system (American Ultraviolet Company) running at 40 FPM (feet per minute) (12.2 meters per minute), and irradiated with a UV lamp at 300 WPI (watts per inch) (118 watts per centimeter). The cure d coatings were examined with a microscope, and intact microcapsules were clearly visible in the coating as shown in FIG. 2.

TABLE 1

UV curable coating formulation

| Test # | Capsules | Monomer (g) | 1,3 butylene glycol dimethacrylate (g) | Epoxyacrylate (g) | PI Mix (g) | Notes |
|---|---|---|---|---|---|---|
| 1 | No capsules | 6 g isobornyl acrylate | 2 | 2 | 0.2 | dry coating |
| 2 | 0.3 g Cake Example 9 | 6 g isobornyl acrylate | 2 | 2 | 0.2 | dry coating, capsule visible |
| 3 | 0.5 g Slurry Example 9 | 6 g isobornyl acrylate | 0 | 2 | 0.2 | sticky |
| 4 | 0.5 g Slurry Example 9 | 6 g isobornyl acrylate | 2 | 2 | 0.2 | dry coating, capsule visible |
| 5 | 0.5 g Slurry Example 2 | 6 g isobornyl acrylate | 2 | 2 | 0.2 | dry coating, capsule visible |
| 6 | 0.5 g Slurry Example 3 | 6 g isobornyl acrylate | 2 | 2 | 0.2 | dry coating, capsule visible |
| 7 | 0.5 g Slurry Example 4 | 6 g isobornyl acrylate | 2 | 2 | 0.2 | dry coating, capsule visible |
| 8 | 0.5 g Slurry Example 5 | 6 g isobornyl acrylate | 2 | 2 | 0.2 | dry coating, capsule visible |
| 9 | 0.5 g Slurry Example 5 | 6 g Photomer4003 (Cognis, Ambler, PA) | 2 | 2 | 0.2 | dry coating, capsule visible |

All methods described herein can be performed in any suitable order unless otherwise indicated herein or otherwise clearly contradicted by context. No language in the specification should be construed as indicating any non-claimed element as essential to the practice of the invention.

All references cited herein are hereby incorporated by reference. Preferred embodiments of this invention are described herein, including the best mode known to the inventors for carrying out the invention. Variations of those preferred embodiments may be come apparent to those of ordinary skill in the art upon reading the foregoing description. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. The invention which is intended to be protected herein is not to be construed as limited to the particular forms disclosed, since these are to be regarded as illustrative rather than restrictive. Variations and changes can be made by those skilled in the art without departing from the spirit and scope of the invention.

What is claimed is:

1. A process of preparing a UV curable coating material of microcapsules with an aqueous internal phase along with core material, the process comprising:

providing an aqueous phase comprising a dissolved or dispersed core material:

dissolving or dispersing wall-forming water-soluble or water-dispersible prepolymers, oligomers or monomers into the aqueous phase;

providing a water-immiscible phase comprising a UV curable monomer or oligomer and at least one emulsifier;

dispersing the aqueous phase into an excess of the water immiscible phase, nonreactive with the wall forming prepolymers, oligomers or monomers, under high shear agitation to form droplets of the aqueous phase dispersed in the water immiscible phase, a water-oil interphase resulting at the interphase of the aqueous and water-immiscible phases;

then adding at least one water insoluble polycondensation polymerization catalyst reactive with the wall forming prepolymers, oligomers or monomers present in the aqueous phase;

forming microcapsules by initiating polycondensation of the monomers, oligomers or prepolymers in the dispersed aqueous phase by heating to precipitate the monomers, oligomers and prepolymers from the aqueous phase at the water-oil interphase thereby forming wall material encapsulating the droplets of the aqueous phase;

adding a UV free radical initiator to the water immiscible phase containing the formed microcapsules thereby forming a coating mixture, irradiating the coating mixture with ultra violet light to decompose the UV free radical initiator and to cure the UV-curable monomers or oligomers of the water immiscible phase thereby forming a cured coating containing the microcapsules having an encapsulated aqueous internal phase along with the core material.

2. The process according to claim 1 including in addition the step of applying the coating mixture onto a substrate.

3. The process according to claim 1 wherein the polymerization catalyst is selected from an acid, a phase transfer catalyst, and a proton transfer catalyst.

4. The process according to claim 3 wherein the polymerization catalyst is a sulfonic acid.

5. The process according to claim 3 wherein the polymerization catalyst is a liquid or solid dispersible in the water immiscible phase.

6. The process according to claim 5 wherein the polymerization catalyst is a fluorinated sulfonic acid copolymer particle or acid cation ion exchange particle.

7. The process according to claim 1 wherein at least one wall-forming prepolymer is also dispersed into the water immiscible solvent.

8. The process according to claim 1 wherein the wall forming prepolymer is selected from urea formaldehyde, melamine formaldehyde, novolac, and phenolic resin.

9. The process according to claim 1 wherein the water immiscible phase includes in addition an organic solvent.

10. A process of preparing a UV curable coating material of microcapsules with an aqueous internal phase along with core material, the process comprising:
   providing an aqueous phase comprising a dissolved or dispersed core material;
   dissolving or dispersing wall-forming water-soluble or water-dispersible prepolymers, oligomers or monomers into the aqueous phase;
   providing a water-immiscible phase comprising at least one organic solvent, nonreactive with the wall forming prepolymers, oligomers or monomers, and at least one emulsifier;
   dispersing the aqueous phase into an excess of the water immiscible phase under high shear agitation to form droplets of the aqueous phase dispersed in the water immiscible phase, a water-oil interphase resulting at the interphase of the aqueous and water-immiscible phases;
   then adding at least one water insoluble polycondensation polymerization catalyst reactive with the wall forming prepolymers, oligomers or monomers present in the aqueous phase;
   forming microcapsules by initiating polycondensation of the monomers, oligomers or prepolymers in the dispersed aqueous phase by heating to precipitate the monomers, oligomers and prepolymers from the aqueous phase at the water-oil interphase thereby forming wall material encapsulating the droplets of the aqueous phase;
   forming a coating mixture by dispersing UV-curable monomers or oligomers into the water immiscible phase along with a UV free radical initiator;
   irradiating the coating mixture with ultra violet light to decompose the UV free radical initiator and to cure the UV-curable monomers or oligomers thereby forming a cured coating containing the microcapsules having an encapsulated aqueous internal phase along with the core material.

11. The process according to claim 10 including in addition the step of applying the coating mixture onto a substrate.

12. The process according to claim 10 wherein the polymerization catalyst is selected from an acid, a phase transfer catalyst, and a proton transfer catalyst.

13. The process according to claim 12 wherein the polymerization catalyst is a sulfonic acid.

14. The process according to claim 12 wherein the polymerization catalyst is a liquid or solid dispersible in the water immiscible phase.

15. The process according to claim 14 wherein the polymerization catalyst is a fluorinated sulfonic acid copolymer particle or acid cation ion exchange particle.

16. The process according to claim 10 wherein at least one wall-forming prepolymer is also dispersed into the water immiscible solvent.

17. The process according to claim 10 wherein the wall forming prepolymer is selected from urea formaldehyde, melamine formaldehyde, novolac, and phenolic resin.

18. A process of preparing a UV curable coating material of microcapsules with an aqueous internal phase along with core material, the process comprising:
   providing an aqueous phase comprising a dissolved or dispersed core material;
   dissolving or dispersing wall-forming water-soluble or water-dispersible prepolymers, oligomers or monomers into the aqueous phase;
   providing a water-immiscible phase comprising at least one organic solvent and at least one emulsifier;
   dispersing the aqueous phase into an excess of the water immiscible phase, nonreactive with the wall-forming prepolymers, oligomers or monomers, under high shear agitation to form droplets of the aqueous phase dispersed in the water immiscible phase, a water-oil interphase resulting at the interphase of the aqueous and water-immiscible phases;
   then adding at least one water insoluble polycondensation polymerization catalyst reactive with the wall forming polymers, oligomers or monomers present in the aqueous phase;
   forming microcapsules by initiating polycondensation of the monomers, oligomers or prepolymers in the dispersed aqueous phase by heating to precipitate the monomers, oligomers and prepolymers from the aqueous phase at the water-oil interphase thereby forming wall material encapsulating the droplets of the aqueous phase;
   decanting the formed microcapsules from the water immiscible phase;
   forming a coating mixture by dispersing the microcapsules into UV-curable monomers or oligomers along with a UV free radical initiator;
   irradiating the coating mixture with ultra violet light to decompose the UV free radical initiator and to cure the UV-curable monomers or oligomers thereby forming a cured coating containing the microcapsules having an encapsulated aqueous internal phase along with the core material.

19. The process according to claim 18 including in addition the step of applying the coating mixture onto a substrate.

20. The process according to claim 18 wherein the polymerization catalyst is selected from an acid, a phase transfer catalyst, and a proton transfer catalyst.

21. The process according to claim 18 wherein the polymerization catalyst is a sulfonic acid.

22. The process according to claim 20 wherein the polymerization catalyst is a liquid or solid dispersible in the water immiscible phase.

23. The process according to claim 22 wherein the polymerization catalyst is a fluorinated sulfonic acid copolymer particle or acid cation ion exchange particle.

24. The process according to claim 18 wherein at least one wall-forming prepolymer is also dispersed into the water immiscible solvent.

25. The process according to claim 18 wherein the wall forming prepolymer is selected from urea formaldehyde, melamine formaldehyde, novolac, and phenolic resin.

* * * * *